United States Patent [19]

Orzel et al.

[11] Patent Number: 5,404,718

[45] Date of Patent: Apr. 11, 1995

[54] ENGINE CONTROL SYSTEM

[75] Inventors: Daniel V. Orzel, Westland; Tri T. Truong, Inkster; David G. Farmer, Plymouth, all of Mich.

[73] Assignee: Ford Motor Company, Dearborn, Mich.

[21] Appl. No.: 127,152

[22] Filed: Sep. 27, 1993

[51] Int. Cl.6 .............................................. F01N 3/20
[52] U.S. Cl. ........................................ 60/274; 60/276; 60/277; 60/285; 123/674; 123/703
[58] Field of Search ............... 60/274, 276, 277, 285; 123/672, 674, 703

[56] References Cited

U.S. PATENT DOCUMENTS

| | | |
|---|---|---|
| 3,939,654 | 2/1976 | Creps ................................. 60/276 |
| 4,130,095 | 12/1978 | Bowler et al. . |
| 4,304,204 | 12/1981 | Glocker et al. ..................... 60/285 |
| 4,526,147 | 7/1985 | Grob . |
| 5,031,838 | 5/1989 | Nagai et al. |
| 5,115,639 | 5/1992 | Gopp ................................. 60/274 |
| 5,207,056 | 5/1993 | Benninger . |
| 5,224,345 | 7/1993 | Schnaibel ........................... 60/274 |
| 5,251,437 | 10/1993 | Furuya . |
| 5,255,512 | 10/1993 | Hamburg et al. . |
| 5,255,515 | 10/1993 | Blumenstock et al. . |
| 5,289,678 | 3/1994 | Grutter . |

Primary Examiner—Ira S. Lazarus
Assistant Examiner—Daniel J. O'Connor
Attorney, Agent, or Firm—Allan J. Lippa; Roger L. May

[57] ABSTRACT

A control system which controls engine air/fuel ratio while providing a measurement of efficiency in the catalytic converter coupled to the engine exhaust. A test period is completed when counts in transitions of a feedback variable derived from an exhaust gas oxygen sensor positioned upstream of the converter have reached a preselected count for each of a plurality of inducted air flow ranges. Converter efficiency is determined during the test cycle by comparing an integration of the feedback variable, after band pass filtering and rectification, to an integration of a downstream exhaust gas oxygen sensor after its output is band pass filtered and rectified.

12 Claims, 6 Drawing Sheets

ENGINE CONTROL SYSTEM

FIELD OF THE INVENTION

The invention relates to controlling an engine's air/fuel ratio and concurrently monitoring the efficiency of a catalytic converter coupled to an engine exhaust.

BACKGROUND OF THE INVENTION

U.S. Pat. No. 5,115,639 discloses an engine air/fuel control system responsive to exhaust gas oxygen sensors positioned both upstream and downstream of a catalytic converter.

It is also known to provide an indication of converter degradation by comparing the amplitude output of the downstream sensor to the upstream sensor. In another type of system, converter degradation is determined by calculating a ratio of switching frequencies between the upstream and downstream sensors. The downstream sensor amplitude and its switching frequency increase as converter efficiency decreases.

The inventors herein have recognized numerous problems with the above approaches to monitoring converter efficiency. With respect to amplitude comparison, exhaust gases from each of the combustion chambers may not be fully mixed in the exhaust manifold. Consequently, there may be variations in amplitude output of a downstream sensor which are caused by lack of exhaust gas mixing rather than converter degradation. Another problem recognized by the inventors, is that sensor amplitude output may become clipped when the engine is operating significantly rich or lean of stoichiometry. Accordingly, amplitude comparisons may not yield accurate determinations of converter efficiency.

The inventors have also discovered significant problems with respect to those systems which utilize comparison of sensor switching frequencies. If the engine air/fuel feedback control loop is in a transient state during a converter test cycle, there may be insufficient switching of the sensors to fully test converter efficiency. Further, both types of prior systems (sensor switching systems and sensor amplitude comparison systems) do not test converter efficiency over the full range of possible exhaust gas flow rates. Converter efficiency may, therefore, not be fully tested.

SUMMARY OF THE INVENTION

An object of the invention herein is to provide accurate monitoring of converter efficiency over a wide range of operating conditions including substantial deviation in the engine air/fuel ratio from stoichiometry.

The above object is achieved, and problems of prior approaches overcome, by providing both a control system and method for controlling engine air/fuel ratio while monitoring efficiency of a catalytic converter positioned in the engine exhaust. In one particular aspect of the invention, the control system comprises the steps of: integrating an output of an exhaust gas oxygen sensor positioned upstream of the catalytic converter to generate a feedback variable; controlling fuel delivery to the engine in response to at least the feedback variable; integrating an absolute value of the feedback variable over a test period to generate a first control signal; integrating a rectified output of an exhaust gas oxygen sensor positioned downstream of the catalytic converter over the test period to generate a second control signal; and calculating a ratio of the second control signal to the first control signal to determine catalytic efficiency.

An advantage of the above aspect of the invention is that accurate determination of converter efficiency is made over a wide range of engine operating conditions including deviation in the engine air/fuel ratio from stoichiometry. Another advantage is that converter efficiency is accurately determined when exhaust gases in proximity to the exhaust gas oxygen sensor are not fully mixed.

BRIEF DESCRIPTION OF THE DRAWINGS

The object and advantages of the invention will be more clearly understood by reading an example of an embodiment in which the invention is used to advantage with reference to the attached drawings wherein.

DESCRIPTION OF AN EMBODIMENT

Figure 1:
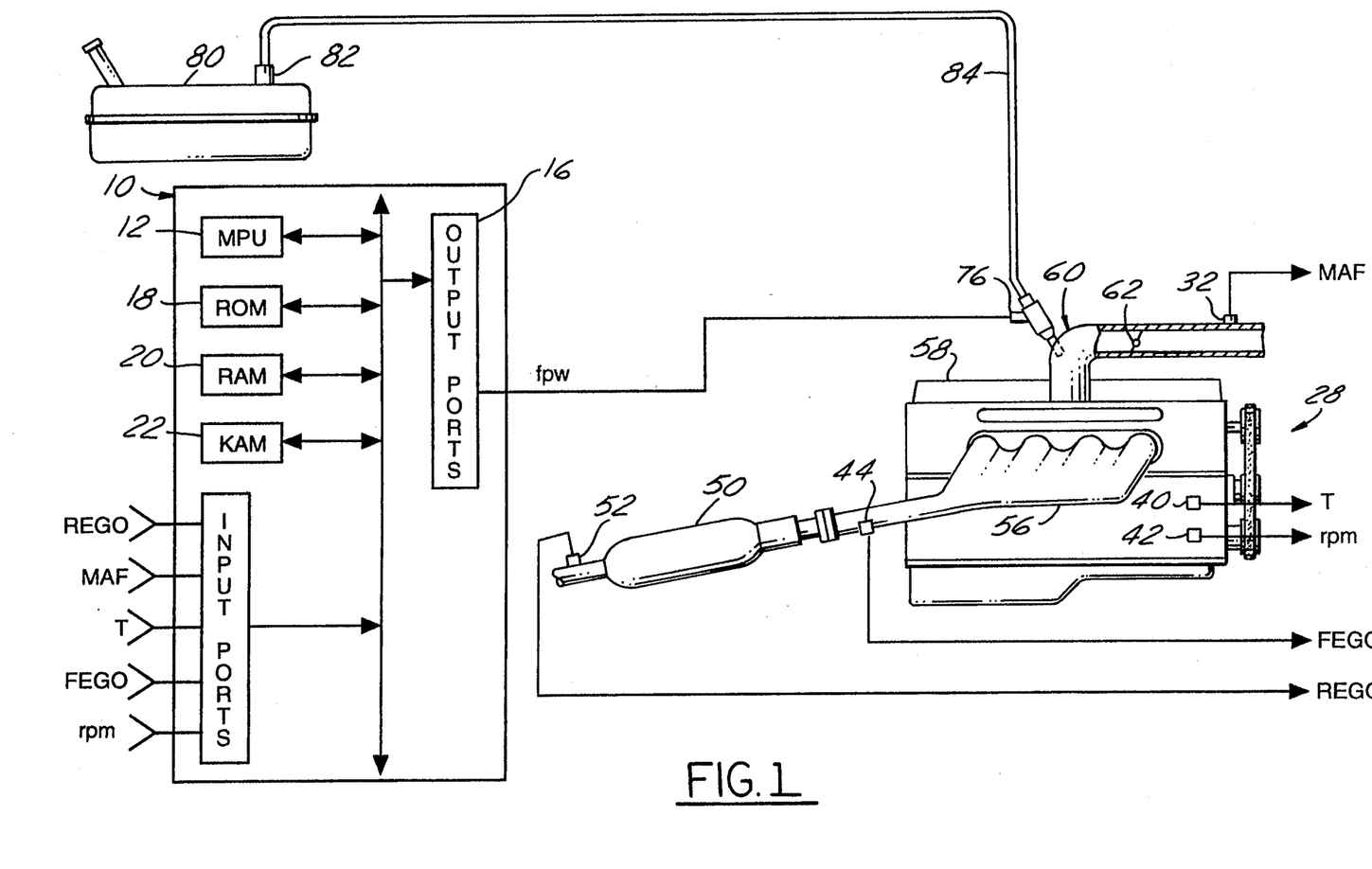
FIG. 1 is a block diagram of an embodiment wherein the invention is used to advantage.

Controller 10 is shown in the block diagram of FIG. 1 as a conventional microcomputer including: microprocessor unit 12; input ports 14; output ports 16; read-only memory 18; random access memory 20; keep-alive memory 22; and a conventional data bus. Controller 10 is shown receiving various signals from sensors coupled to engine 28 including: measurement of inducted mass airflow (MAF) from mass airflow sensor 32; engine coolant temperature (T) from temperature sensor 40; indication of engine speed (rpm) from tachometer 42; output signal FEGO from conventional exhaust gas oxygen sensor 44, positioned upstream of catalytic converter 50; and signal REGO from another conventional exhaust gas oxygen sensor (52) coupled to exhaust manifold 56 downstream of catalytic converter 52. Intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84. Other engine components and systems such as an ignition system are not shown because they are well known to those skilled in the art.

Although a central fuel injection system is shown, the invention claimed herein may be used to advantage with other types of systems such as sequential fuel injection or carbureted systems. Those skilled in the art will also recognize that the invention claimed herein is applicable to other engine configurations such as "stereo control systems" having exhaust gas oxygen sensors positioned in each of the exhaust manifolds for engines having a "V" configuration.

Figures 2, 3:
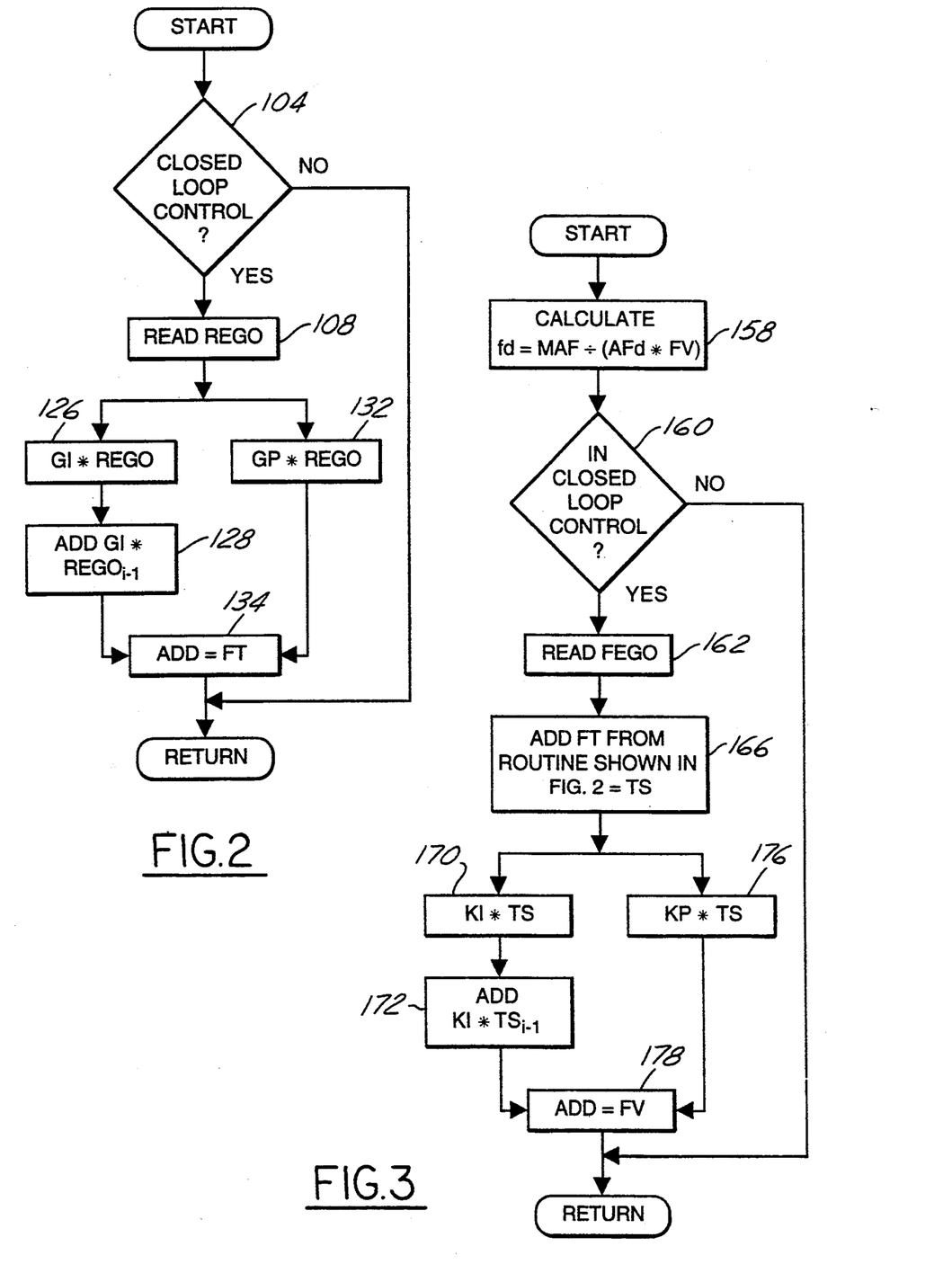
FIG. 2 is a high level flowchart of various operations performed by a portion of the embodiment shown in FIG. 1.
FIG. 3 is a high level flowchart of various operations performed by a portion of the embodiment shown in FIG. 1.

Referring now to FIG. 2, a flowchart of a routine performed by controller 10 to generate fuel trim signal FT is now described. A determination is first made whether closed-loop air/fuel control is to be commenced (step 104) by monitoring engine operating conditions such as temperature. When closed-loop control commences, signal REGO is read (step 108) and subsequently processed in a proportional plus integral controller as described below.

Referring first to step 126, signal REGO is multiplied by gain constant GI and the resulting product added to products previously accumulated (GI * $REGO_{i-1}$) in step 128. Stated another way, signal REGO is integrated each sample period (i) in steps determined by gain constant GI. During step 132, signal REGO is also multiplied by proportional gain GP. The integral value from step 128 is added to the proportional value from step 132 during addition step 134 to generate fuel trim signal FT.

The routine executed by controller 10 to generate the desired quantity of liquid fuel delivered to engine 28 is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV which is generated as described below with respect to steps 160–178 shown in FIG. 3.

After determining that closed-loop control is desired (step 160) by monitoring engine operating conditions such as temperature (T), signal FEGO is read during step 162. Signal FEGO is then trimmed (in this example by addition) with trim signal FT which is transferred from the routine previously described with reference to FIG. 2 to generate trimmed signal TS. The product of integral gain value KI times trimmed signal TS (step 170) is generated and added to the previously accumulated products (step 172). That is, trimmed signal TS is integrated in steps determined by gain constant KI each sample period (i) during step 172. A product of proportional gain KP times trimmed signal TS (step 176) is then added to the integration of KI * TS during step 178 to generate feedback variable FV.

Alternatively, the process described above with particular reference to FIG. 3 may be performed by biasing signal FV, rather than trimming signal FEGO, with fuel trim signal FT. In one such alternative embodiment, two proportional gain constants ($KP_1$ and $KP_2$) are used to advantage. Proportional gain $KP_1$ multiplies signal FEGO when it switches from a lean to a rich state and proportional gain $KP_2$ multiplies signal FEGO when it switches from a rich to a lean state. Proportional term $KP_1$ is incremented when fuel trim signal FT indicates a lean bias is desired and proportional term $KP_1$ is decreased (or $KP_2$ incremented) when a rich bias is desired by fuel trim signal FT.

Figure 4A:
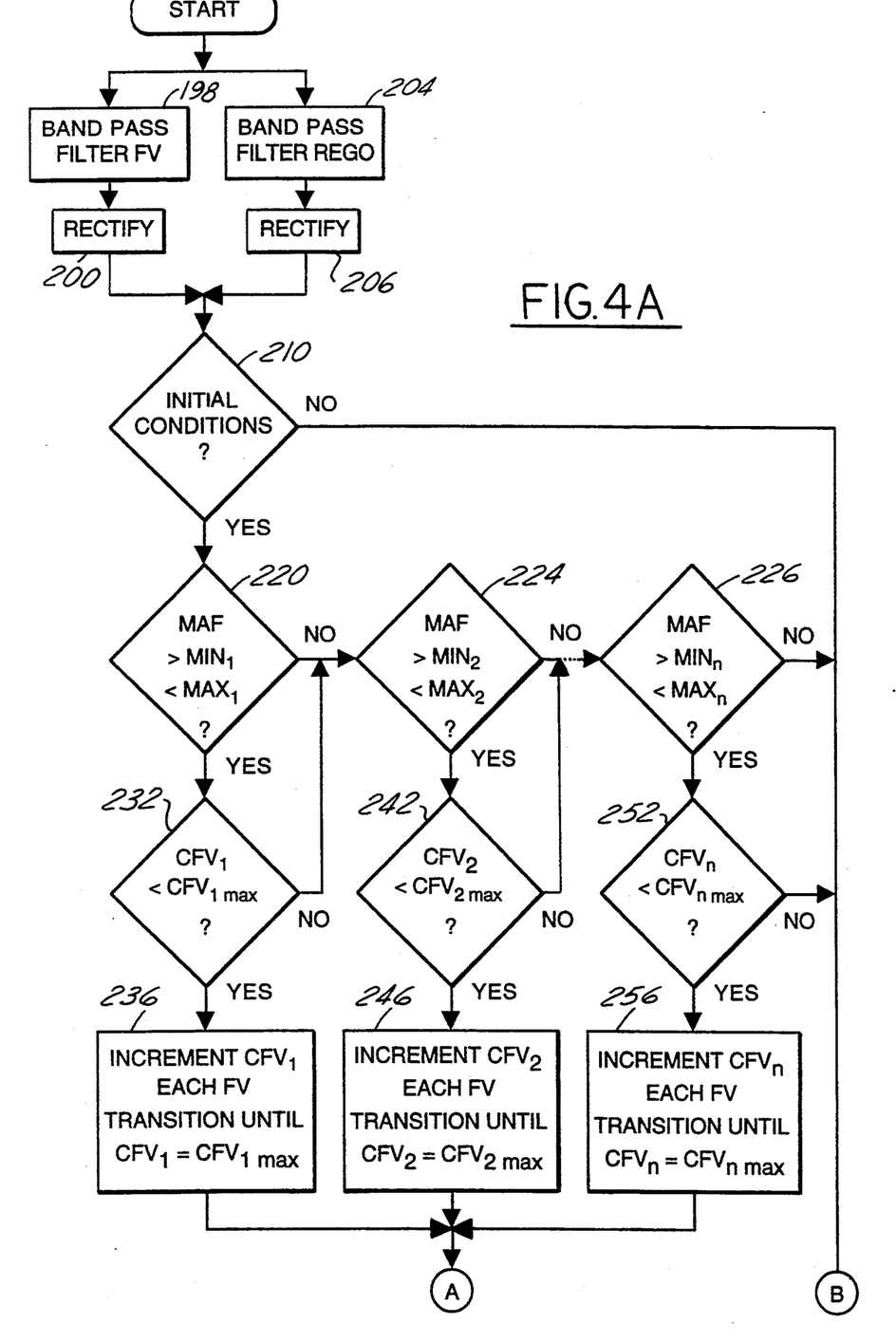
FIGS. 4A-4B are a high level flowchart of various operations performed by a portion of the embodiment shown in FIG. 1.
Figure 4B:
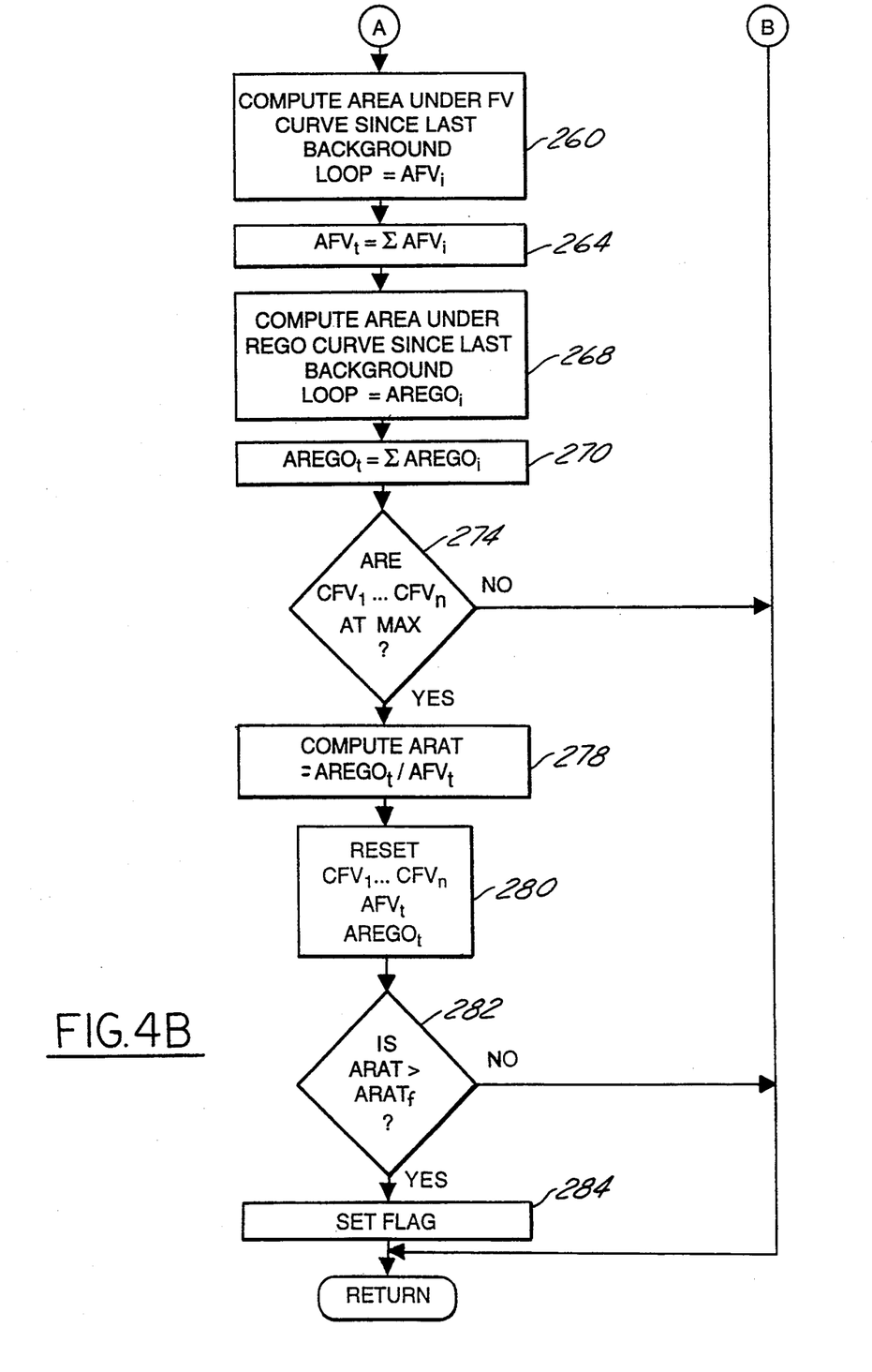
Figure 5A:
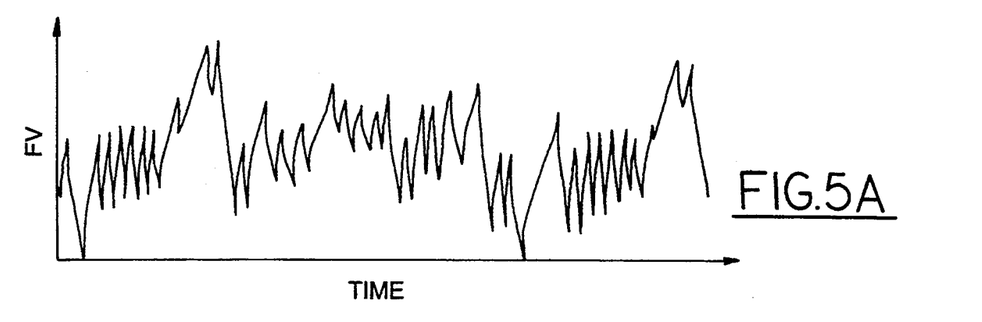
FIGS. 5A-5B are graphical representations of various electrical signals generated by the embodiment shown in FIG. 1.
Figure 5B:
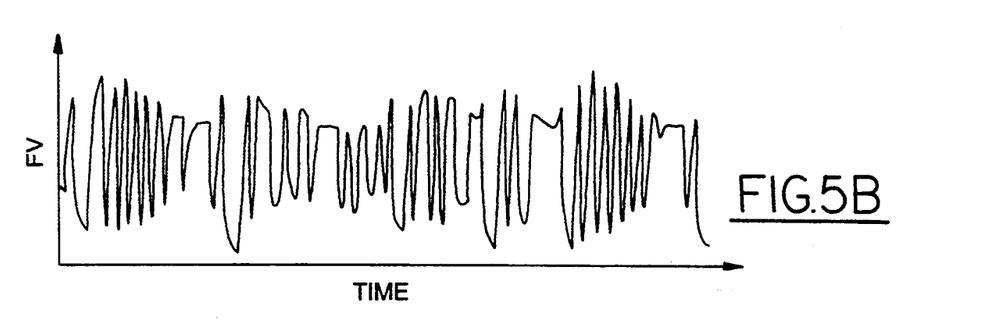

An example of testing converter efficiency is now described with particular reference to the flowchart shown in FIGS. 4A–4B. During step 198 and step 200, signal FV is band pass filtered and then rectified. A graphical representation of signal FV during typical engine operation is show in FIG. 5A and its filtered output shown in FIG. 5B (before rectification). It is noted that the band pass filter operation facilitates the subsequent operation of computing area under its curve (i.e., integration).

Figure 6A:
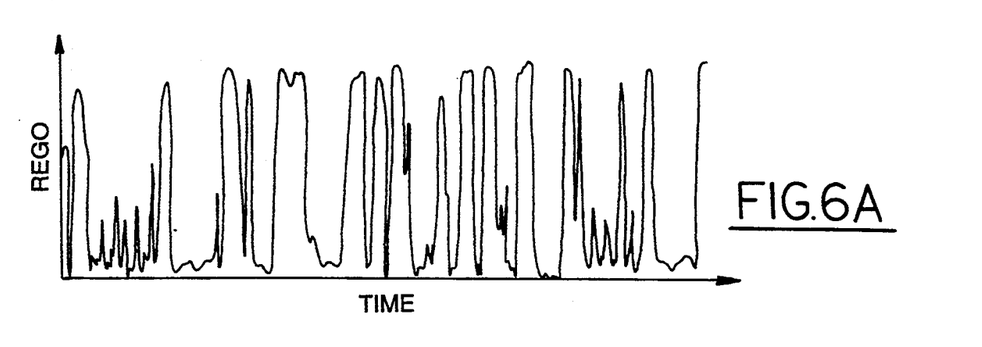
FIGS. 6A-6B are graphical representations of various electrical signals generated by the embodiment shown in FIG. 1.
Figure 6B:
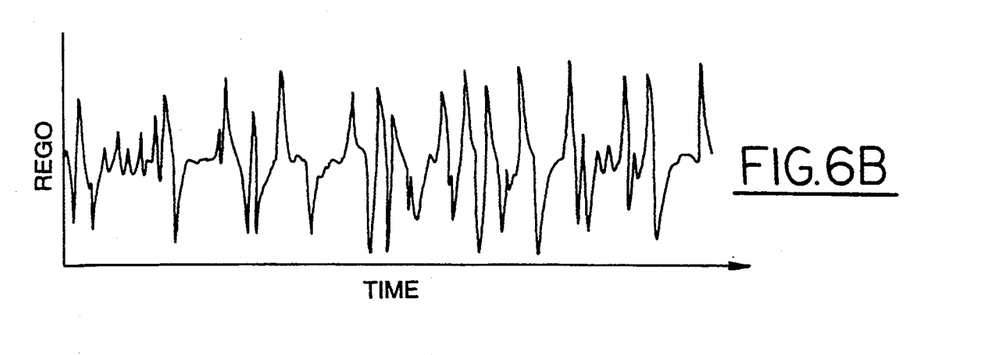

Similarly, signal REGO is band pass filtered, and the filtered output rectified (see steps 204 and 206 in FIG. 4A). A graphical representation of signal REGO during typical engine operation is shown in FIG. 6A, and the signal output after band pass filtering is shown in FIG. 6B (before rectification). Once again, the band pass filtering enables subsequent area under the curve computation or integration.

Continuing with FIGS. 4A–4B, initial engine conditions are checked during step 210 before entering the test cycle described below. More specifically, engine temperature (T) is within a predetermined range, a predetermined time elapsed since the engine was started, and the closed loop air/fuel control has been operable for a preselected time.

During steps 220, 224, and 226, the inducted air flow range in which engine 28 is operating is determined. These ranges are described as range (1), range (2) . . . , and range (n) for this example wherein "n" inducted air flow ranges are used to advantage. Assuming engine 28 is operating within air flow range (1), the transition between states of signal FV are counted to generate count signal $CFV_1$. While engine operation remains within air flow range (1), count $CFV_1$ is incremental each transition of signal FV until count $CFV_1$ is equal to maximum count $CFV_{1max}$ (steps 232 and 236).

The above described operation occurs for each air flow range. For example, when engine 28 is operating within air flow range (n), as shown in step 226, count $CFV_n$ is incremental each transition in signal FV until it reaches maximum count $CFV_{nmax}$ (steps 252 and 256). As described below with particular reference to step 274, a converter test cycle is completed when engine 28 has operated in each of "n" airflow ranges during a preselected number of signal FV transitions in each of the airflow ranges.

During each background loop of controller 10, the area under the curve formed by signal FV (after it is band pass filtered and rectified) is computed since the last background loop. This partial area is shown as signal $AFV_i$ in step 260. Value $AFV_i$ is added to the areas accumulated during previous background loops to generate total area $AFV_t$ (step 264).

Proceeding in a similar manner to that described above with respect to the generation of total area $AFV_t$, the area under the curve formed by signal REGO (after it is band pass filtered and rectified) is computed during steps 268 and 270. More specifically, during each background loop of controller 10, the area under the REGO curve is computed during the present background loop (step 268) and added to the previously accumulated areas to generate total area $AREGO_t$ (step 270).

Those skilled in the art will recognize that the above described operations of computing area under a curve defined by either signal FV or signal REGO, may be performed by integrating respective signal FV or signal REGO. Each area computation of signal $AFV_i$ or signal $AREGO_i$ is similar to an integration step during each background loop.

During step 274, a determination is made that the test cycle has been completed when the count in transitions of each feedback variable ($CFV_1 \ldots CFV_n$) has reached its respective maximum value (MAX). After the test cycle has been completed, area ratio ARAT is computed by dividing the total area under the feedback variable curve ($AFV_t$) into the area under the REGO curve ($AREGO_t$) during step 278. Variables $CFV_1 \ldots CFV_n$, $AFV_t$, and $AREGO_t$ are also reset (step 280). When computed area ratio ARAT is greater than reference or predetermined area ratio $ARAT_f$, as shown in step 282, a flag is set (step 284) indicating degraded converter efficiency.

Figure 7:
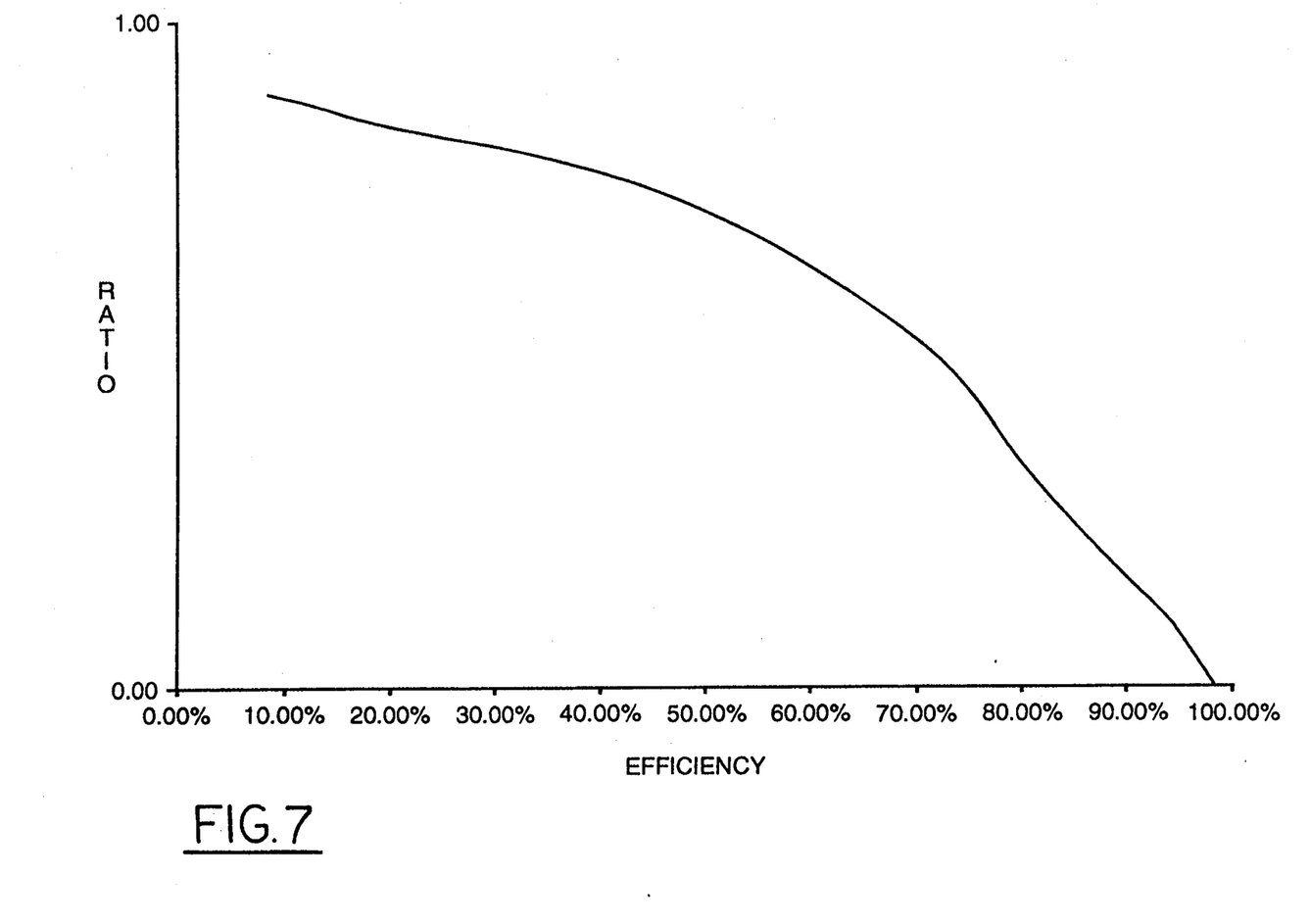
FIG. 7 is a graphical representation of converter efficiency.

The actual ratio calculated in step 278 may also be used to provide a measurement of actual converter efficiency. Due to the advantages described previously herein, this indication of converter efficiency is accurate over a wider range of converter efficiencies than heretofore possible and is apparent upon viewing the graph of ratios to converter efficiencies shown in FIG. 7.

An example of operation has been presented wherein both upstream sensor 44 and downstream sensor 52 are two-state exhaust gas oxygen sensors. The invention claimed herein, however, may be used to advantage with other sensors such as proportional sensors. Further, the test cycle has been determined in the example presented herein by counting transitions in feedback variable FV during a plurality of air flow ranges ($CFV_1 \ldots CFV_n$). The test cycle may also be determined by counting transitions in signal FEGO from upstream sensor 44 during each of the air flow ranges. In addition, the count in transitions of feedback variable FV, or signal FEGO, may be weighted for different air flow ranges. For example, it may be desirable to test for longer periods at high air flow ranges than low air flow ranges because catalytic converter 50 is converting a greater mass of exhaust gases at the higher air flow ranges.

Other modifications will become apparent to those skilled in the art without departing from the spirit and scope of the invention claimed herein. Accordingly, the inventors herein intends that the invention be defined only by the following claims.

What is claimed:

1. A method for controlling engine air/fuel ratio while monitoring efficiency of a catalytic converter positioned in the engine exhaust, comprising the steps of:
   integrating an output of an exhaust gas oxygen sensor positioned upstream of the catalytic converter to generate a feedback variable;
   controlling fuel delivery to the engine in response to at least said feedback variable;
   integrating an absolute value of said feedback variable over a test period to generate a first control signal;
   integrating a rectified output of an exhaust gas oxygen sensor positioned downstream of the catalytic converter over said test period to generate a second control signal; and
   calculating a ratio of said second control signal to said first control signal to determine catalytic efficiency.

2. The method recited in claim 1 further comprising the step of band pass filtering said feedback variable.

3. The method recited in claim 1 further comprising the step of band pass filtering said downstream exhaust gas oxygen sensor output.

4. The method recited in claim 2 wherein said calculating step further comprises the step of comparing said ratio to a preselected value.

5. A method for indicating efficiency of a catalytic converter positioned in the engine exhaust, comprising the steps of:
   providing a converter test cycle by determining when the engine has completed operation within each of a plurality of inducted airflow ranges for at least a minimum duration in each of said airflow ranges;
   integrating an output of an exhaust gas oxygen sensor positioned upstream of the catalytic converter over said test cycle to generate a feedback variable;
   generating each of said minimum durations by determining when a preselected number of transitions from a first state to a second state has occurred in an output signal derived from said upstream exhaust gas oxygen sensor while the engine is operating in one of said airflow ranges;
   integrating an absolute value of said feedback variable over said test cycle to generate a first control signal;
   integrating a rectified output of an exhaust gas oxygen sensor positioned downstream of the catalytic converter over said test cycle to generate a second control signal; and
   calculating a ratio of said second control signal to said first control signal to determine catalytic efficiency.

6. The method recited in claim 5 further comprising the steps of band pass filtering said feedback variable and band pass filtering said downstream exhaust gas oxygen sensor output.

7. The method recited in claim 5 wherein said generating step utilizes said feedback variable as said output signal.

8. The method recited in claim 5 further comprising the step of adjusting fuel delivered to the engine in response to both said feedback variable and a signal derived from said second control signal.

9. A system for controlling engine air/fuel ratio and indicating efficiency of a catalytic converter positioned in the engine exhaust, comprising:
   control means for controlling fuel delivered to the engine in response to a feedback variable derived from an output of an exhaust gas oxygen sensor positioned upstream of the converter;
   test means for indicating completion of a converter test when the engine has completed operation within each of a plurality of inducted airflow ranges for at least a predetermined duration in each of said airflow ranges, said test means generating each of said predetermined durations when a preselected number of transitions in said feedback variable from a first state to a second state has occurred;
   area calculating means for calculating area under a curve defined by said feedback variable to generate a first control signal and for calculating area under another curve defined by an output of an exhaust gas oxygen sensor positioned downstream of the catalytic converter to generate a second control signal; and
   indicator means for calculating a ratio between said second control signal and said first control signal to indicate converter efficiency.

10. The system recited in claim 9 further comprising first filter means for band pass filtering said feedback variable and second filter means for band pass filtering said downstream exhaust gas oxygen sensor output.

11. The system recited in claim 9 wherein said control means further includes trim means for trimming said feedback variable in response to an integration of said downstream sensor.

12. The system recited in claim 9 wherein said test means determines operation within a particular airflow range by comparing inducted airflow to a preselected minimum value and a preselected maximum value so that converter efficiency is determined over a range of exhaust gas flows.

* * * * *